June 1, 1948. C. N. PAXTON 2,442,375
AIRPLANE PILOT'S SEAT
Filed April 24, 1947 3 Sheets-Sheet 2
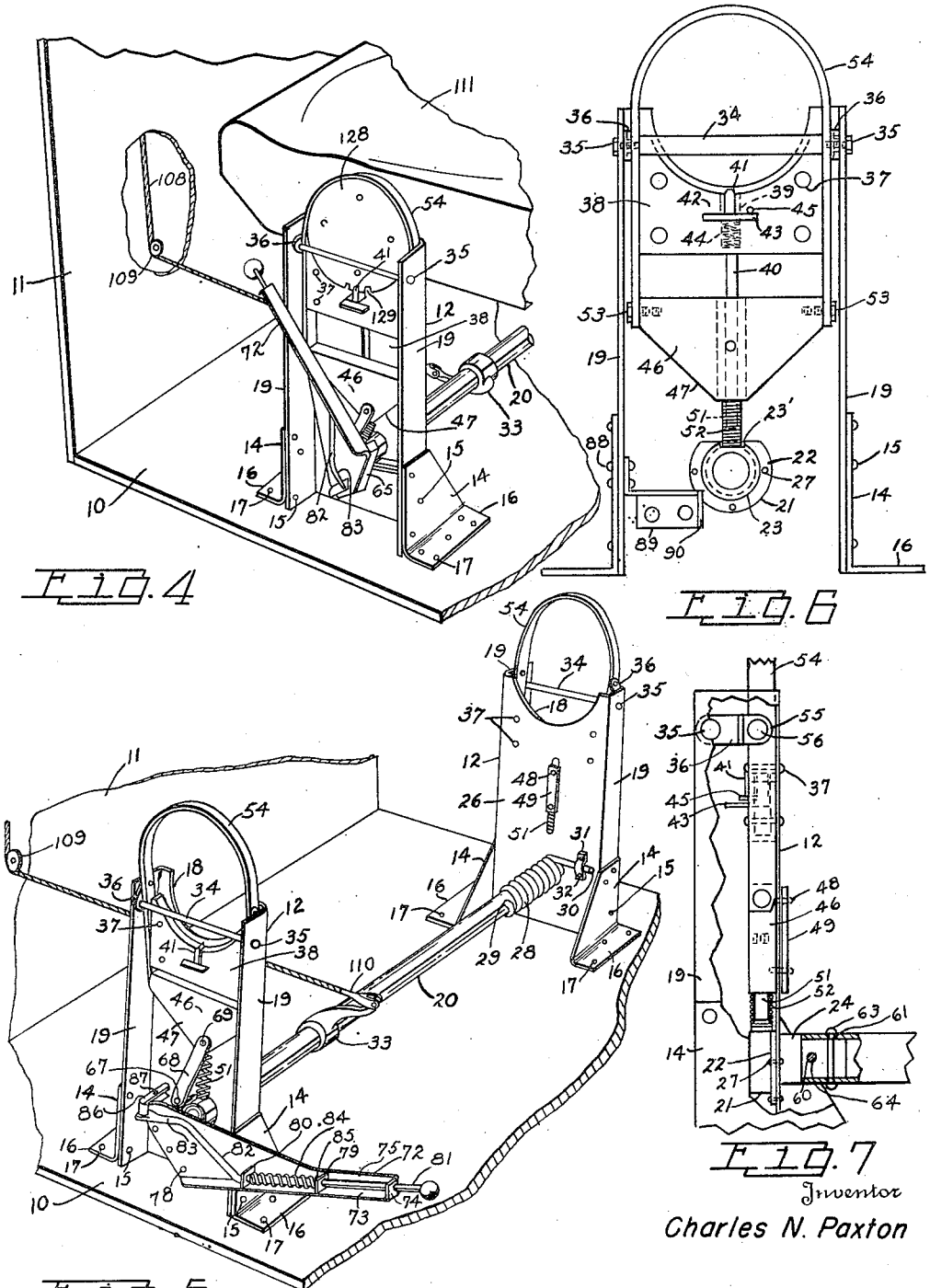
Inventor
Charles N. Paxton
By
Attorney Patented June 1, 1948

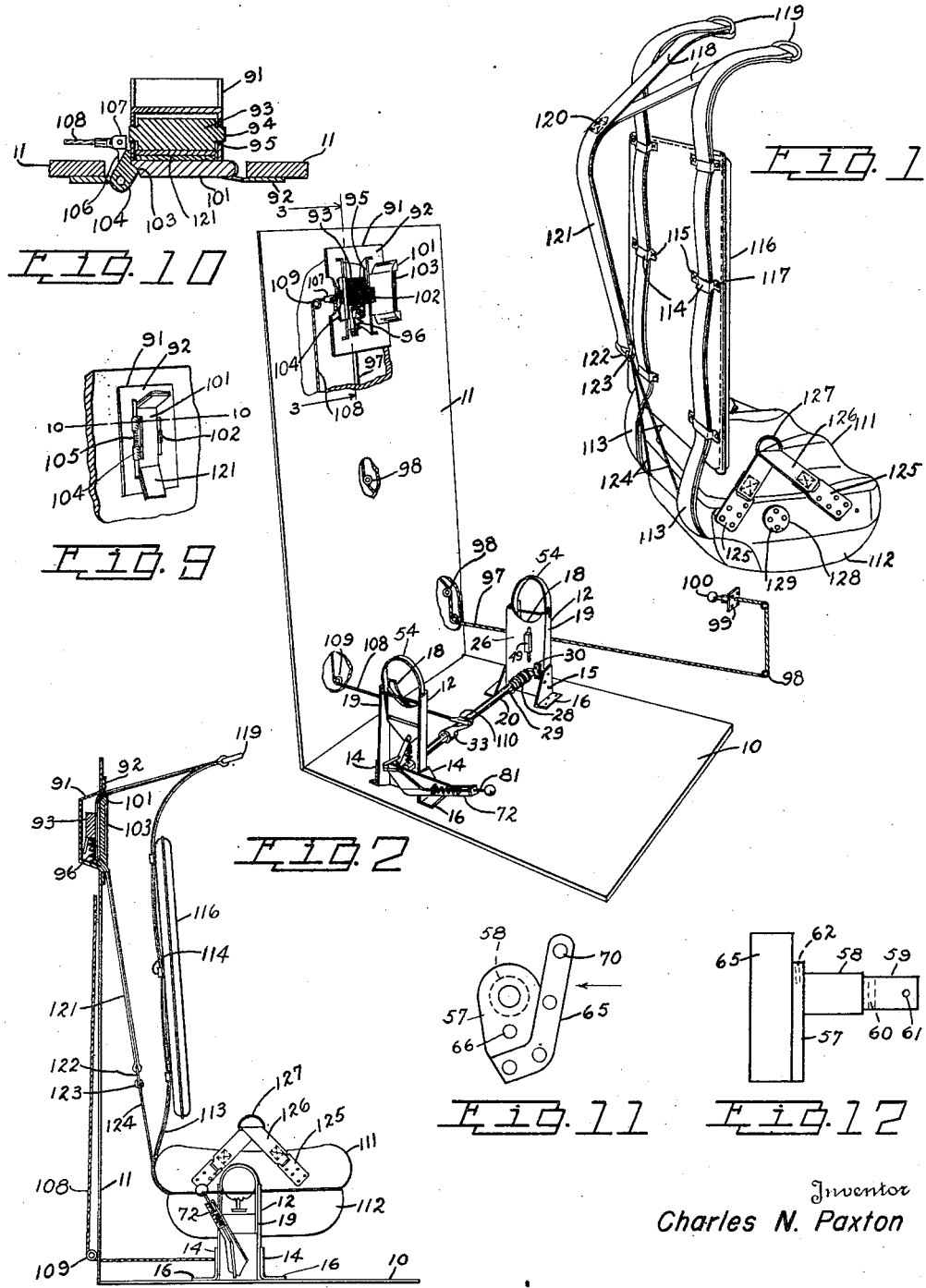

2,442,375

UNITED STATES PATENT OFFICE 2,442,375

AIRPLANE PILOT'S SEAT

Charles N. Paxton, United States Navy

Application April 24, 1947, Serial No. 743,580

7 Claims. (Cl. 244—122)

(Granted under the act of March 3, 1883, as amended April 30, 1928; 370 O. G. 757)

The present invention relates to an airplane pilot's seat.

It is an object of the present invention to provide a rigid seat assembly, one that is detachably mounted in an airplane.

Another object of the present invention is the provision of a pilot's seat that will permit selective tilting at the choice of the pilot.

A still further object of the present invention is the provision of a space in the seat for stowage of emergency equipment and means for attaching a packed parachute to the bottom of the seat when suspended independent of seat support load.

A still further object of the present invention is the provision of mechanism for clamping the seat in place or for releasing the seat.

A still further object of the present invention is the provision of means for restraining against a forward load.

A still further object of the present invention is the provision of means permitting strap freedom for a pilot to move forward.

A still further object of the present invention is the provision of means for releasing straps in unison with seat attachments to permit the pilot to leave an airplane with all equipment attached when desired or in an emergency.

Figure 1 is a perspective view of my pilot seat.

Figure 2 is a perspective view of elements in an airplane to which the pilot seat is attached, the elements being shown in unlocked position, portions being broken away.

Figure 3 is a side elevational view of Figure 2, the lock strap housing being shown in section on line 3—3 of Figure 2.

Figure 4 is an enlarged perspective view of one of the supports and illustrating the operating lever and its associated mechanism in locked position.

Figure 5 is an enlarged perspective view of the supports and illustrating the operating lever and its associated mechanism in unlocked position.

Figure 6 is an enlarged side elevational view of one of the supports and illustrating the spring loaded pin engaging means and shaft bearing.

Figure 7 is an end elevational view of the support on the lever side with the wall broken away and illustrating the crank assembly to the operating shaft, parts being shown in section.

Figure 9 is a perspective view of strap locking means in locked position, parts being shown fragmentarily.

Figure 10 is a sectional view taken on line 10—10 of Figure 4.

Figure 11 is a view in elevation of one side of the cam and cam block.

Figure 12 is a side elevational view of Figure 11 looking in the direction of the arrow.

Figure 8:
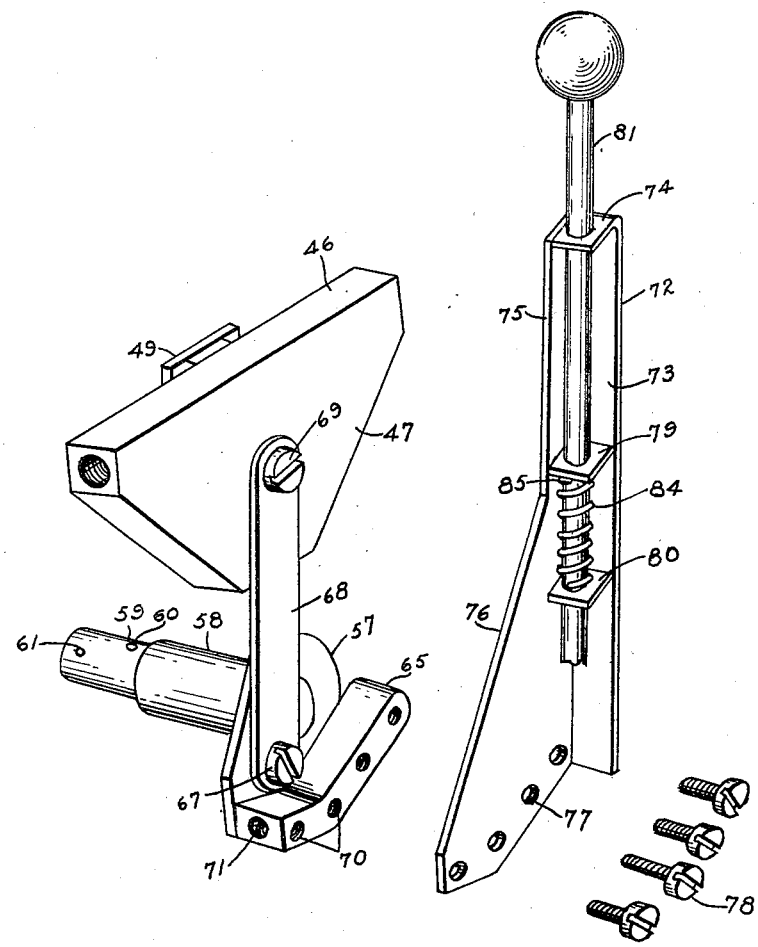
Figure 8 is an enlarged perspective view of the cam, cam block, sliding block, link, and operating lever.

Referring to the drawings the numeral 10 represents a base, and 11 a back, these elements being of any suitable material and mounted in a cock-pit of an airplane. To the base element 10 are supports 12 that are in spaced relation and they are secured to brackets 14 by rivets 15, the brackets having a flange 16 that is secured to the element 10 by rivets 17. The supports being identical and the elements secured to or mounted therein being identical, the same reference numerals have been applied to like parts for clarity. The supports 12 are each provided with an arcuate cut-out portion 18 and right angularly disposed flanges 19 that form a channel or trackway for a purpose to be later described. Interposed between the supports 12 is a rod or shaft 20, the ends of the shaft being connected to elements of bearing 21. The bearing 21 has a flange 22, a boss 23 having a recess 23', a smaller boss 24 and a uniform bore 25 through the bosses, the flange being secured to one face of wall 26 of each support 12 by rivets 27. The shaft 20 carries a spring 28, one end 29 being secured to the shaft, the opposite end 30 being anchored to the wall 26, of one of the supports 12 by a strap 31 that is secured to the wall by machine screws 32. The shaft 20 also carries an arm 33 that is securely fixed to the shaft by any suitable means for a purpose to be later described.

Mounted between the flanges 19 of the supports 12 is a rod 34 provided with threaded ends that receive nuts 35. Each of the rods 34 on the inside of the flanges 19 supports one end of a pair of links 36 for a purpose to be later described. On each of the supports 12 there is secured by rivets 37, a lock block 38, the lock block being provided with an arcuate portion that is approximately the same as the arcuate portion 18 and a bore 39, a portion 40 being open and in the form of a slot. Within the bore 39 is mounted a lug 41 having an angularly disposed wall 42, a plate portion 43 that serves as a guide means for the lug 41 that is under tension of a compression spring 44. A stop pin 45 for limiting the movement of the lug 41 and the plate 43 is positioned on the lock block 38 as shown in Figure 6 of the drawings.

Below each lock block there is positioned a block 46 that is adapted for sliding movement, the block having a tapered portion 47. Secured to each block 46 by bolts 48 is a key-way block 49, the key-way of the block engaging the slot 40 in the wall 26. The apex of the block 46 is provided with a depending rod 51 that is encompassed by a spring 52, the lower end of the spring being seated in the recess 23', the lower end of the rod being spaced from the bearing 21. To the side walls of the sliding block 46 there is pivotally mounted by bolts 53, the ends of a strap 54, the ends 55 of links 36 being pivotally mounted to the strap 54 by bolts 56.

On each end of the shaft 20 is mounted a cam 57 having a shaft 58 that is provided with a reduced end 59 the end having bores 60 and 61. The cam 57 has a pin press fit 62 to prevent shearing off of the cam from the shaft 58. The cam 57, shaft 58 and reduced end 59 are mounted in the bearing 21, the shaft 58 passing through the bosses 23, and 24, the reduced end of shaft 59 engaging the shaft 20 and secured thereto by pins 63 and 64 that engage the bores 60 and 61. The cam may be an integral part of the cam block 65 or it may be secured to the cam block by bolting or welding, and it is provided with a threaded bore 66 that receives a screw 67, for pivotally securing one end of link 68 thereto, the opposite end of the link being pivotally mounted to the sliding block by bolt 69. The cam block 65 is provided with a plurality of threaded bores 70 in one side wall, and in one end wall with a threaded bore 71 for a purpose to be later described.

A lever 72 for operating the pilot seat mechanism comprises one side wall 73 of uniform width and having the upper portion bent inwardly forming a guide block 74 and provided with an aperture, the side 75 being of uniform width approximately one-half its length, at which point it takes the form of a plate designated by the numeral 76. The plate portion 76 is provided with a plurality of apertures 77 that are in alignment with the threaded bores 70 that receive screws 78 that secure the lever housing to the cam block 65. Mounted in the lever housing 72 are guide blocks 79 and 80 each being provided with an aperture. A lever handle 81 engages the apertures in the guide blocks 74, 79, and 80, the portion 82 of the handle being bent outwardly and the portion 83 bent at approximately a right angle to the portion 82. Interposed between the guide blocks 79 and 80 is a spring 84 that encompasses the lever handle 81, the end 85 of the spring being secured to the lever. Pivotally mounted to the end of the portion 83 of the lever is a bar 86 that is also pivotally mounted to the cam block 64 by a bolt 87 that engages the threaded bore 71. To one of the flanges 19 there is secured by rivets 88 a bracket 89 having a cutout portion 90, one face of the bracket being secured to one face of one of the supports 12.

To the back 11 and centrally thereof adjacent the top, is a housing 91 having a flange plate front 92. Within the housing is mounted a locking block 93 having splines 94 that engage slots 95 that are disposed in the side walls of the housing and disposed at an angle as shown in Figure 2, the block being adapted for sliding movement. Interposed between the lower edge of the block and the bottom wall of the housing is a spring 96 that keeps the locking block 93 under tension. To the bottom of the locking block 93 is secured a clevis that is connected to one end of cable 97, the cable being trained through pulleys 98, some of the pulleys being secured to the back 11, the opposite end of the cable passing through a bracket 99 and being connected to a pull knob 100.

Hingedly mounted on the flange plate 92 of the housing, is a door 101 having a spring loaded hinge 102. One edge of the door is provided with an angularly cut-out portion 103, adapted for engagement with a dog latch bar 104 the dog latch bar being provided with a spring 105. The dog latch bar has an arm 106 to which is secured a clevis 107 on one end of cable 108. The cable is trained through pulleys 109 that are secured to the back 11, the opposite end of cable 108 being provided with a clevis 110 that is connected to the arm 33.

The seat 111 is in the form of a hollow shell, the underside of the seat being hollow receives a parachute 112 that is attached in the hollow cavity. The cavity, may if desired also contain emergency equipment. Straps 113 having one end connected to the parachute rise from the seat and they are supported by transverse straps 114 that are in spaced relation and have one end 115 stitched to a pad 116, the opposite end of the transverse straps being provided with a clasp 117 that engages a clasp element carried by the pad. To the ends of the riser straps 113 is secured one of the ends of back straps 118, the ends of the straps 113 and 118 being securely fastened to rings 119. The straps 118 are joined at 120 forming a single strap 121, the opposite ends of straps 118 having an element 122 that is in the shape of a triangle and it is provided with a ring 123 through which passes a bungee 124, the ends of the bungee being secured to the straps 113. To each end of the seat 111 is secured plates 125 having an eye loop through which a strap 126 passes, the ends of the strap being secured in the eye loops, the strap being provided with a ring 127. Also fixedly secured to each end of the seat is a disc 128, having a plurality of notches 129.

As shown in Figure 3 the seat 111 is positioned in the supports 19, the discs 128 on the seat engaging the arcuate portion 18 in the supports 19. The lever housing 72 is moved to the position shown in Figures 3 and 4 which is the locked position, and during this movement the strap 121 is placed in the housing 91, the door 101 is closed impinging the strap, through pressure of spring 96 to the door 101, the edge 102 of the door being in locked engagement with the dog latch bar 104, the shaft 20 being under tension of spring 28. During movement of the lever housing 72 to the latched position the following movements of the various elements takes place. The cam block 65 and cam 57 move with the lever arm, the rod 20 being connected to the cam shaft moves, the sliding block 46 moves downwardly due to the lower end of link 68 being secured by bolt 67 to the cam 57, the upper end of the link 68 being secured to the sliding block 46 by bolt 69. The strap 54 being connected to the sliding block 46 moves from an inclined position as shown in Figure 3 to the position shown in Figure 4 which is the locked position of the strap 54 to the block or disc 128, the locking engagement being effected by the links 36. When the lever housing 72 is moved to locked position the bar 86 engages the bracket 89 due to its being pivotally mounted to the lever handle 72 and to the cam block 65.

An aviator then positions himself in the seat and secures his harness to the rings 119 and 127. If he desires to move forward or backward he pulls the cable 97 that pulls the block 93 down, allowing the strap 121 to move up or down depending on whether the aviator desires to move forward or backward. During this movement the pin 42 is actuated and engages one of the notches 129 in the disc 128. The block 93, when released from the pull on cable 97 again wedges the strap 121 against the door 101 through the action of the spring 96.

If the aviator has to make an emergency jump, the lever handle 81 is pushed down releasing the bar 86 from the bracket 89, the lever arm 72 moving to release position and being assisted by the spring 28 on shaft 29, and during the movement of the lever arm the cam 57 exerts a push on the link 68 assisted by the spring 52, pushing the block 46 upwardly, the strap 54 moving into an inclined angle due to the action of links 36 thus releasing the straps 54 from engagement with the discs 128, the bar 34 acting as a guide rest for strap 54. Simultaneously with the movement of the lever arm 72, a pull is exerted on the cable 108 by the arm 33 and spring 28 on the shaft 29, the cable releasing the dog latch bar 104, the door 101, thus freeing the strap 121.

The invention described herein may be manufactured and used by or for the Government of the United States of America for governmental purposes without the payment of any royalties thereon or therefor.

What I claim is:

1. A pilot's seat for airplanes comprising supports, slidable means in said supports, means for engaging said seat connected to said slidable means, means on said seat for engagement with engaging means on said slidable means, a shaft interposed between said supports, an arm on said shaft, means on the end of said shaft connected to said shaft, means connecting said slidable means to the means on the end of said shaft, and means on one end of said shaft for moving the shaft, slidable means and the seat engaging means to a locked position.

2. A pilot's seat for airplanes comprising supports, slidable means in said supports, means for engaging said seat connected to said slidable means, means on said seat for engagement with the engaging means on said slidable means, a shaft interposed between said supports, an arm on said shaft, one end of a cable connected to said arm, the opposite end of said cable connected to a spring loaded door, of a strap control means comprising a housing, a locking block in said housing and adapted for sliding movement, and means connected to said block for normally urging said block upwardly, means on the end of said shaft connected to said shaft, means connecting said slidable means to the means on the end of said shaft, and means on one end of said shaft for moving the shaft, the arm, cable, slidable means and the seat engaging means to a locked position.

3. A pilot's seat for airplanes comprising supports, slidable means in said supports, means for engaging said seat connected to said slidable means, means on said seat for engagement with the engaging means on said slidable means, a parachute in said seat, straps connected to said parachute, means on said straps and seat for engagement with a pilot's harness, resilient means connected to said seat straps for contracting one of said seat straps, a shaft interposed between said supports, an arm on said shaft, means on the end of said shaft connected to said shaft, means connecting said slidable means to the means on the end of said shaft, and means on one end of said shaft for moving the shaft, slidable means and the seat engaging means to locked positions.

4. A pilot's seat for airplanes comprising supports, slidable means in said supports, means for engaging said seat connected to said slidable means, means on said seat for engagement with the engaging means on said slidable means, a parachute in said seat, straps connected to said parachute, means for releasably engaging one of said parachute straps, means on said straps and seat for engagement with a pilot's harness, resilient means connected to said seat straps for contracting one of said seat straps when released from said strap releasable means.

5. A pilot's seat for airplanes comprising supports, slidable means in said supports, means for engaging said seat connected to said slidable means, means on said seat for engagement with the engaging means on said slidable means, a parachute in said seat, straps connected to said parachute, means for releasably engaging one of said parachute straps, means on said straps and seat for engagement with a pilot's harness, resilient means connected to said seat straps for contracting one of said seat straps, slots in said means on said seat, means carried by said supports adapted for engagement with said slots upon movement of said seat, and means connected to said releasable means allowing said strap to move with the movement of said seat.

6. A pilot's seat for airplanes comprising supports, slidable means in said supports, means for engaging said seat connected to said slidable means, means on said seat for engagement with the engaging means on said slidable means, a parachute in said seat, straps connected to said parachute, means on said straps and seat for engagement with a pilot's harness, resilient means connected to said seat straps for contracting one of said seat straps, means for releasably engaging one of said parachute straps, a shaft interposed between said supports, an arm on said shaft, means on the end of said shaft connected to said shaft, means connecting said slidable means to the means on the end of said shaft, means connecting said arm to said strap releasable means, and means on one end of said shaft for moving the shaft to an unlocked position, the said slidable means releasing the seat engaging means and the strap releasing means, the contracting means contracting said strap released from said releasing means.

7. A pilot's seat for airplanes comprising supports, slidable means in said supports, means for engaging said seat connected to said slidable means, means on said seat adapted for engagement with the engaging means on said slidable means, a shaft interposed between said supports, an arm on said shaft, one end of a cable connected to said arm the opposite end of said cable connected to a spring loaded door, of a strap control means comprising a housing, a locking block in said housing and adapted for silding movement, means connected to said block for manually urging said block upwardly in locked position, means connected to said block for releasing said block from locked position, means on the end of said shaft connected to said shaft, means connecting said slidable means to the means on the end of said shaft, and means on one end of said shaft for moving the shaft, arm, cable, slidable means and the seat engaging means to a locked position.

CHARLES N. PAXTON.